US 8,698,349 B2

(12) United States Patent
Kurumizawa et al.

(10) Patent No.: US 8,698,349 B2
(45) Date of Patent: Apr. 15, 2014

(54) BATTERY CHARGING INLET AND LOCKING DEVICE

(75) Inventors: Naoto Kurumizawa, Aichi (JP); Keiji Kahara, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 13/107,251

(22) Filed: May 13, 2011

(65) Prior Publication Data

US 2011/0287649 A1    Nov. 24, 2011

(30) Foreign Application Priority Data

May 18, 2010    (JP) ................................. 2010-114416

(51) Int. Cl.
*B60L 1/00* (2006.01)
*H02J 7/00* (2006.01)
*H01R 13/62* (2006.01)

(52) U.S. Cl.
USPC .......................... 307/10.1; 320/109; 439/304

(58) Field of Classification Search
USPC .............. 320/109, 137; 307/10.2, 10.3, 10.4, 307/10.5, 10.1, 10.7; 903/903, 907; 439/102, 304
See application file for complete search history.

(56) References Cited

U.S. PATENT DOCUMENTS

| | | | | |
|---|---|---|---|---|
| 5,478,250 A | * | 12/1995 | Hoffman | 439/142 |
| 7,804,274 B2 | * | 9/2010 | Baxter et al. | 320/109 |
| 7,952,325 B2 | * | 5/2011 | Baxter et al. | 320/109 |
| 8,000,858 B2 | * | 8/2011 | Tonegawa et al. | 701/36 |
| 8,025,526 B1 | * | 9/2011 | Tormey et al. | 439/528 |
| 8,172,599 B2 | * | 5/2012 | Konchan | 439/352 |
| 8,197,277 B1 | * | 6/2012 | Teichmann | 439/304 |
| 2009/0082916 A1 | | 3/2009 | Tanaka | |
| 2010/0228405 A1 | * | 9/2010 | Morgal et al. | 701/2 |

FOREIGN PATENT DOCUMENTS

| | | |
|---|---|---|
| JP | 62-94670 | 5/1987 |
| JP | 62-94690 | 5/1987 |
| JP | 2009-081917 | 4/2009 |
| JP | 09-161898 | 6/2011 |

OTHER PUBLICATIONS

Official Action (no English translation available) for Japanese Patent Application No. 2010-114416 mailed Aug. 13, 2013, 2 pages.

* cited by examiner

*Primary Examiner* — Richard V Muralidar
(74) *Attorney, Agent, or Firm* — Sheridan Ross P.C.

(57) ABSTRACT

A locking device for a power feeding plug installed in a vehicle. The vehicle includes an inlet that receives the power feeding plug to charge a battery, which powers a motor. A door antenna transmits a verification signal to an electronic key. The locking device includes a lock bar moved between lock and unlock positions. The lock bar blocks the power feeding plug, which is attached to the inlet, when located at the lock position to prohibit removal of the power feeding plug from the inlet. An inlet antenna transmits the verification signal to an area that includes the inlet. The inlet antenna and door antenna are arranged at different locations. A controller moves the lock bar when verification of the electronic key is accomplished in response to the verification signal from the inlet antenna.

14 Claims, 9 Drawing Sheets

BATTERY CHARGING INLET AND LOCKING DEVICE

CROSS-REFERENCE TO RELATED APPLICATIONS

This application is based upon and claims the benefit of priority from prior Japanese Patent Application No. 2010-114416, filed on May 18, 2010, the entire contents of which are incorporated herein by reference.

BACKGROUND OF THE INVENTION

The present invention relates to a charging inlet device including a lock mechanism capable of locking a power feeding plug to a power receiving connector.

Vehicles with reduced carbon dioxide emissions, such as hybrid vehicles and electric vehicles, have become popular in recent years. Such a vehicle uses a battery to power a motor, which produces rotation, and runs mainly using the drive force of the motor.

Whenever the state of charge of the vehicle battery becomes low, the battery is charged, for example, with a household outlet or at a charging station. Japanese Laid-Open Patent Publication No. 9-161898 describes a power feeding plug connected to a distal end of a power cable. The power feeding plug is connected to an inlet of a vehicle to charge the vehicle battery. Further, the power feeding plug, which is the part of the cable a user grasps, is inserted into the inlet like when refueling a gasoline engine vehicle.

Although fast charging technology is being developed, the time required to charge the battery of an electric vehicle is still much longer than the time required to refuel a gasoline engine vehicle. As a result, the vehicle may be left unattended over a long period of time with the power feeding plug connected to the inlet of the vehicle. In such a case, someone may wrongfully remove the power feeding plug and connect it to another vehicle to steal electricity or steal the power feeding plug.

To solve this problem, a locking device may be used to lock the power feeding plug to the inlet of the vehicle. This prevents unauthorized removal of the power feeding plug from the power receiving connector.

To prevent unauthorized operation of the locking device, ID verification may be performed with an electronic key. For example, a key-operation-free system, which is installed in a vehicle, may be applied to prevent such unauthorized operation. However, a key-operation-free system would form a relatively large communication area outside the vehicle. Thus, when the electronic key is near the vehicle, ID verification would be accomplished regardless of where the electronic key is located. As a result, the locking device would perform a locking or unlocking operation even though the true user does not intend to do so.

SUMMARY OF THE INVENTION

One aspect of the present invention is a charging inlet device installed in a communication device. The communication device includes a battery and an inlet, which receives a power feeding plug to charge the battery. The communication device transmits a wireless verification signal to an electronic key and permits or performs an operation when verification of the electronic key is accomplished. The charging inlet device includes a lock mechanism that prevents removal of the power feeding plug from the inlet. The lock mechanism performs at least one of a locking operation and an unlocking operation on the power feeding plug when the verification of the electronic key through a wireless verification signal is accomplished. An inlet antenna arranged near the inlet antenna transmits the wireless verification signal to an area near the inlet.

A further aspect of the present invention is a locking device for a power feeding plug installed in a vehicle. The vehicle includes a battery, a motor driven by the battery, an inlet that receives the power feeding plug to charge the battery, a door antenna that transmits a verification radio wave signal to an electronic key, and a door locked or unlocked when authorized radio wave communication is performed between the electronic key and the door antenna. The locking device includes a movable member moved between a lock position and an unlock position. The movable member is located to interfere with the power feeding plug, which is connected to the inlet, upon removal of the power feeding plug when located at the lock position to prohibit removal of the power feeding plug from the inlet. The movable member is moved to a position at which the movable member does not interfere with the power feeding plug when located at the unlock position to permit removal of the power feeding plug from the inlet. An inlet antenna transmits the verification radio wave signal to a local communication area including the inlet. The inlet antenna and the door antenna are arranged at different locations. A controller moves the movable member when verification of the electronic key is accomplished in response to the verification radio wave signal from the inlet antenna.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A charging inlet device according to one embodiment of the present invention will now be described.

Figure 1:
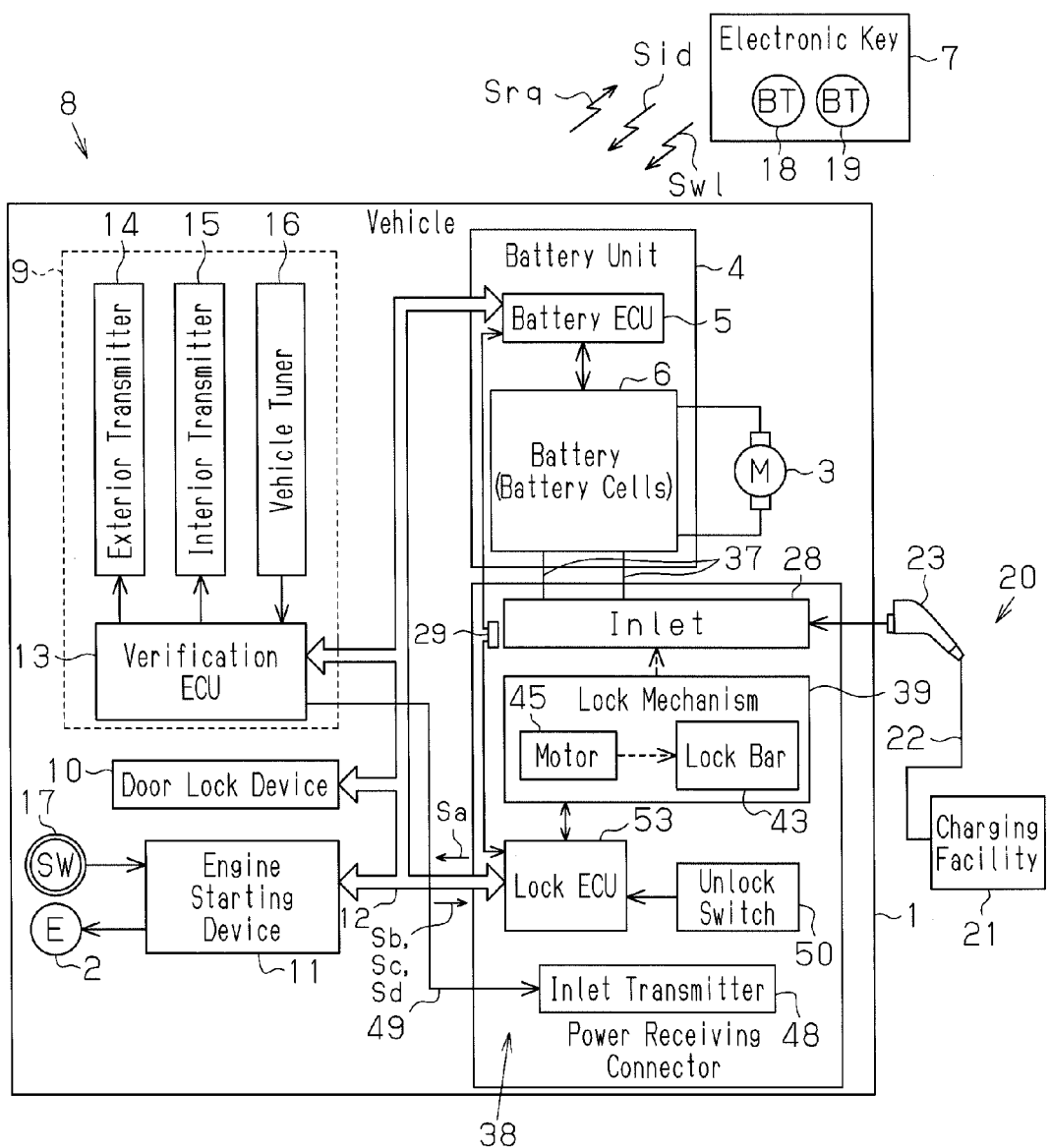
FIG. 1 is a block diagram of a locking device for a power feeding plug according to one embodiment of the present invention.

Referring to FIG. 1, a hybrid vehicle (hereinafter referred to as the vehicle 1) includes an engine 2 and a motor 3, which serve as power sources for vehicle wheels. The vehicle 1 is driven in one of a plurality of modes. More specifically, the vehicle 1 is operated in a mode using only the engine 2 to drive the wheels, a mode using the motor 3 while generating electric power with the engine 2 to drive the wheels, a mode using both the engine 2 and the motor 3 to drive the wheels, and a mode using only the motor 3 to drive the wheels. The vehicle 1 is one example of a communication device.

The vehicle 1 includes a battery unit 4 that supplies the motor 3 with power. The battery unit 4 includes a battery ECU 5, which manages operations of the battery unit 4, and a battery 6, which includes a plurality of battery cells. The battery unit 4 is a single unit, or battery pack, and incorporates the battery ECU 5 and the battery cells in a housing. The motor 3 is connected by a wire to the battery 6 and produces rotation when powered by the battery 6.

An electronic key system 8, which performs key verification with an electronic key 7 through wireless communication, is installed in the vehicle 1. The electronic key system 8 is, for example, a key-operation free system. In a key-operation-free system, the vehicle 1 transmits an inquiry (request signal Srq) to the electronic key 7. In response, the electronic key 7 returns an ID code (ID signal Sid) to the vehicle 1. The vehicle 1 then performs ID verification using the ID code. The electronic key system 8 may also be a wireless key system that remotely controls in-vehicle devices by the operation of buttons on the electronic key 7.

The vehicle 1 includes a key verification device 9, a door lock device 10, and an engine starting device 11, which are connected to one another by an in-vehicle bus 12. The key verification device 9 performs ID verification with the electronic key 7. The door lock device 10 manages door locking operations. The engine starting device 11 manages operations of the engine 2. The key verification device 9 includes a verification electronic control unit (ECU) 13, which controls the key verification device 9. The verification ECU 13 includes a memory (not shown), which registers an ID code of the electronic key 7 that corresponds to the vehicle 1.

The verification ECU 13 is connected to exterior transmitters 14, an interior transmitter 15, and a vehicle tuner 16. Each exterior transmitter 14 transmits a low frequency (LF) radio wave outside the vehicle 1. The interior transmitter 15 transmits an LF radio wave inside the vehicle 1. The vehicle tuner 16 receives an ultrahigh frequency (UHF) radio wave. The exterior transmitters 14 and the interior transmitter 15 each transmit a request signal Srq, which is an ID return request, on an LF radio wave to attempt smart communication. Here, the exterior transmitters 14 and the interior transmitter 15 are examples of an antenna other than an inlet antenna. In the illustrated example, the exterior transmitter is also referred to as a door antenna.

The verification ECU 13 receives an ID signal Sid from the electronic key 7 in response to the request signal Srq and performs ID verification, or smart verification. When smart verification with the electronic key 7 outside the vehicle 1, namely, exterior verification, is accomplished, the verification ECU 13 permits or performs locking or unlocking of the doors with the door lock device 10. When smart verification with the electronic key 7 inside the vehicle 1, namely, interior verification, is accomplished, the verification ECU 13 permits the starting of the engine and power activation when an engine switch 17 is pushed.

The electronic key 7 includes a lock button 18 and an unlock button 19, which are operated to remotely lock and unlock the doors. When the lock button 18 or unlock button 19 is operated, the electronic key 7 transmits a corresponding wireless signal Swl. The vehicle 1 receives the wireless signal Swl and performs ID verification with an ID code that is included in the wireless signal Swl. When ID verification is accomplished, the vehicle 1 performs an operation that is in accordance with the wireless signal Swl.

Figure 2:
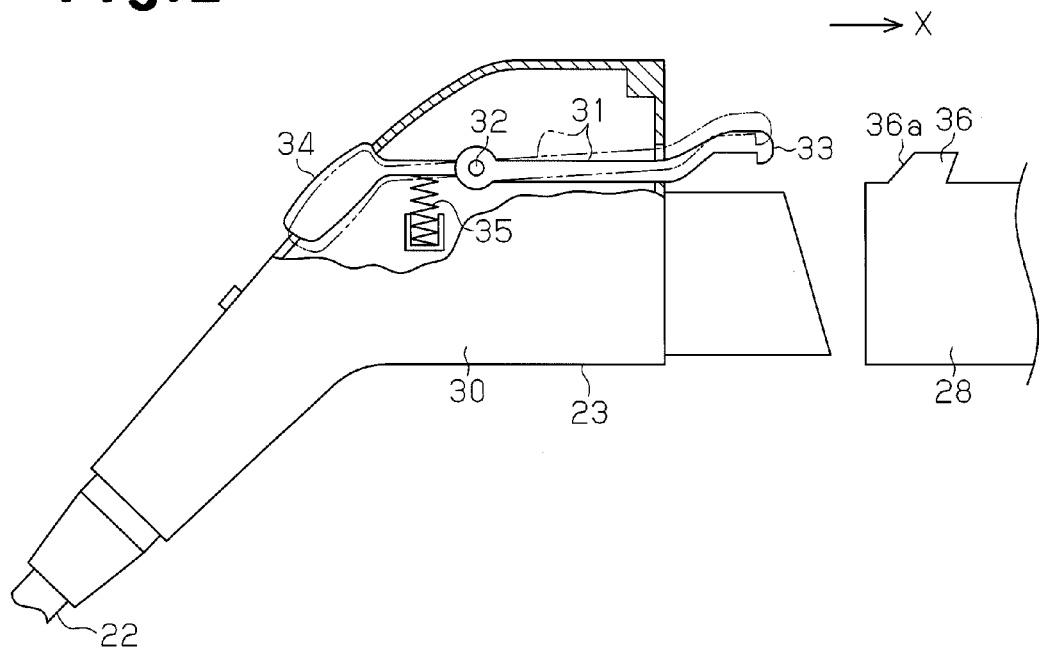
FIG. 2 is a side view, partly in cross-section, showing the power feeding plug prior to connection to an inlet.
Figure 3:
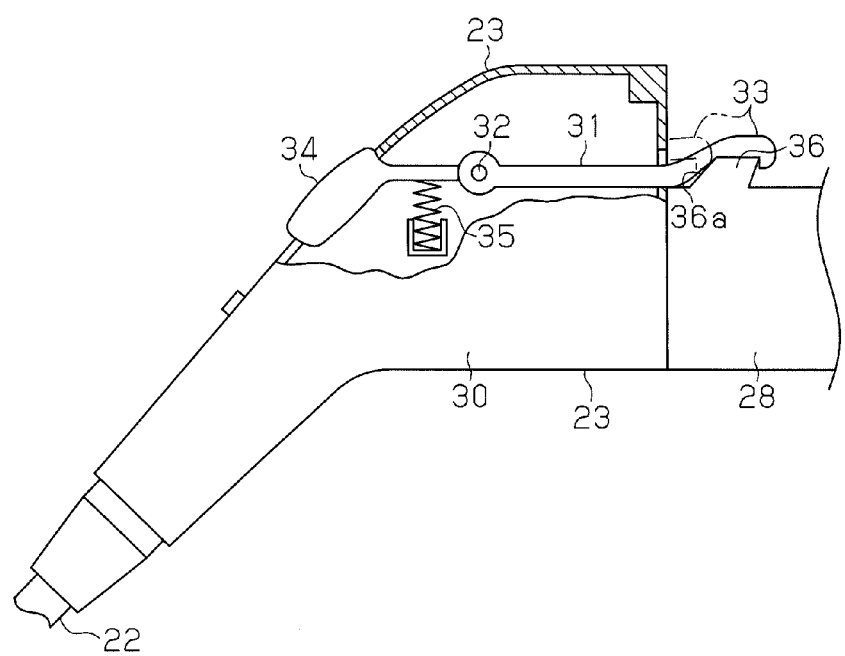
FIG. 3 is a side view, partly in cross-section, showing the power feeding plug connected to the inlet.
Figure 4:
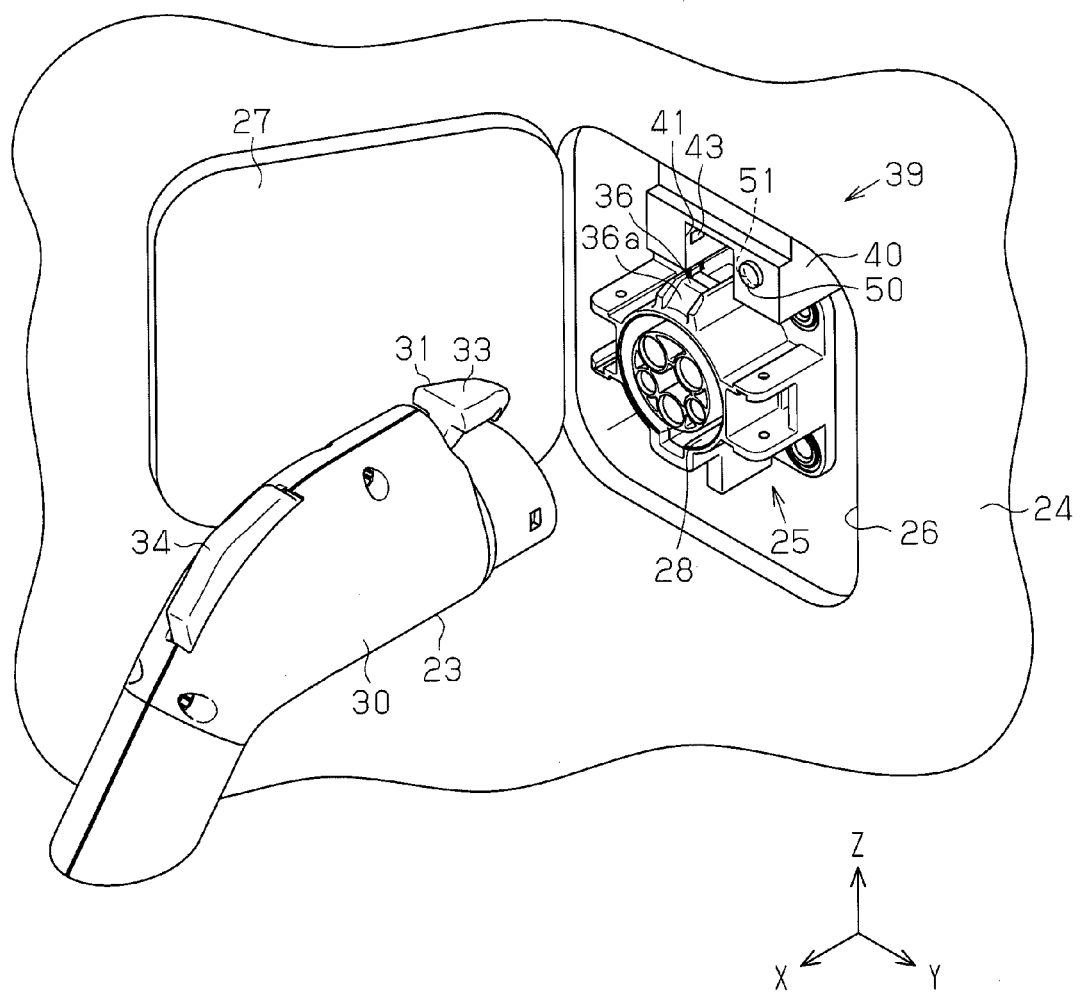
FIG. 4 is a perspective view showing a power receiving connector and the inlet.

The vehicle 1 further includes a charging system 20 that charges the battery 6. The battery 6 may be charged at a charging facility 21, which may be a charging station or a household outlet of a commercial power supply. A charging cable 22, which is arranged in the charging facility 21, is connected to the vehicle 1 to charge the battery 6. As shown in FIGS. 2 to 4, the charging cable 22 includes a distal end to which a power feeding plug 23 is coupled.

Referring to FIGS. 1 to 4, the power feeding plug 23 is connected to a power receiving connector 25, which is arranged, for example, in a side wall of a vehicle body 24 (refer to FIG. 4). The power receiving connector 25 includes an accommodation cavity 26 (refer to FIG. 4), which is closed by a lid 27. An inlet 28 is arranged in the power receiving connector 25. Electrical terminals of the power feeding plug 23 are connected to the inlet 28. As shown in FIG. 1, the inlet 28 includes a plug detection sensor 29, which detects complete insertion of the power feeding plug 23.

As shown in FIGS. 2 to 4, the power feeding plug 23 includes a plug body 30. A lock lever 31 is pivotally supported by a shaft 32, which is arranged in the plug body 30, to prevent removal of the power feeding plug 23 from the inlet 28. The shaft 32 extends perpendicular to an insertion direction (X axis direction as shown in FIG. 2) of the power feeding plug 23. Further, the lock lever 31 includes a distal end, which forms a hook 33, and a basal end, which forms a button 34. The hook 33 and the button 34 are exposed from the plug body 30. An urging member 35 is arranged between the button 34 and the shaft 32 of the lock lever 31. The urging member 35 constantly urges the lock lever 31 toward a close position.

As shown in FIG. 4, a projection 36, which includes an inclined surface 36a, is formed in the power receiving connector 25. In the illustrated example, the projection 36, projects outward from the inlet 28. When connecting the power feeding plug 23 to the power receiving connector 25, the hook 33 of the power feeding plug 23 comes into contact with the inclined surface 36a of the projection 36 in the power receiving connector 25 and moves upward along the inclined surface 36a. This pivots the lock lever 31 toward an open position. Then, as shown by the solid lines in FIG. 3, when the hook 33 moves beyond the inclined surface 36a and the power feeding plug 23 is completely inserted into the inlet 28, the urging force of the urging member 35 pivots the lock lever 31 downward toward the close position. This engages the hook 33 with the projection 36 and prevents removal of the power feeding plug 23 from the inlet 28.

When the plug detection sensor 29 detects complete insertion of the power feeding plug 23 into the inlet 28, the plug detection sensor 29 provides a detection signal to the battery ECU 5. Then, the battery ECU 5 sends an inquiry to the verification ECU 13 on the ID verification result. When ID verification has not been accomplished, the verification ECU 13 retries smart verification. When ID verification has been accomplished, the battery ECU 5 starts charging the battery 6 with the power feeding plug 23 when a switch (not shown), which arranged in a current path of the battery 6, is activated.

The removal of the power feeding plug 23 from the inlet 28 will now be described. After charging is completed, the user presses the button 34 of the lock lever 31. This pivots the lock lever 31 toward the open position and disengages the hook 33 from the projection 36. In this state, the user pulls and removes the power feeding plug 23 from the inlet 28.

As shown in FIG. 1, the power receiving connector 25 includes a locking device 38 that prevents unauthorized removal of the power feeding plug 23 from the inlet 28. As shown in FIGS. 5 to 10, the locking device 38 includes a lock mechanism 39 (electric lock mechanism). The lock mechanism 39 includes a motor 45, a lock bar 43, and a case 40. The case 40 has an interior that defines an accommodation compartment 42, which accommodates various components of the lock mechanism 39 such as the motor 45 and the lock bar 43. A recess, namely, a lock lever port 41, is formed in an outer surface of the case 40. The lock lever port 41 receives a lock lever 31 (hook 33), which engages with the projection 36. A clearance that permits movement of the hook 33 to the open position is provided between opposing surfaces of the lock lever port 41 and the lock lever 31.

The lock bar 43 is inserted into an opening 44, which is formed in a side wall of the lock lever port 41. The lock bar 43 linearly moves back and forth in a Y direction between a retracted position (unlock position) shown in FIG. 5 and a projected position (lock position) shown in FIG. 6. When located at the projected position, the lock bar 43 restricts movement of the lock lever 31, which is engaged with the projection 36, toward the open position.

Figure 8:
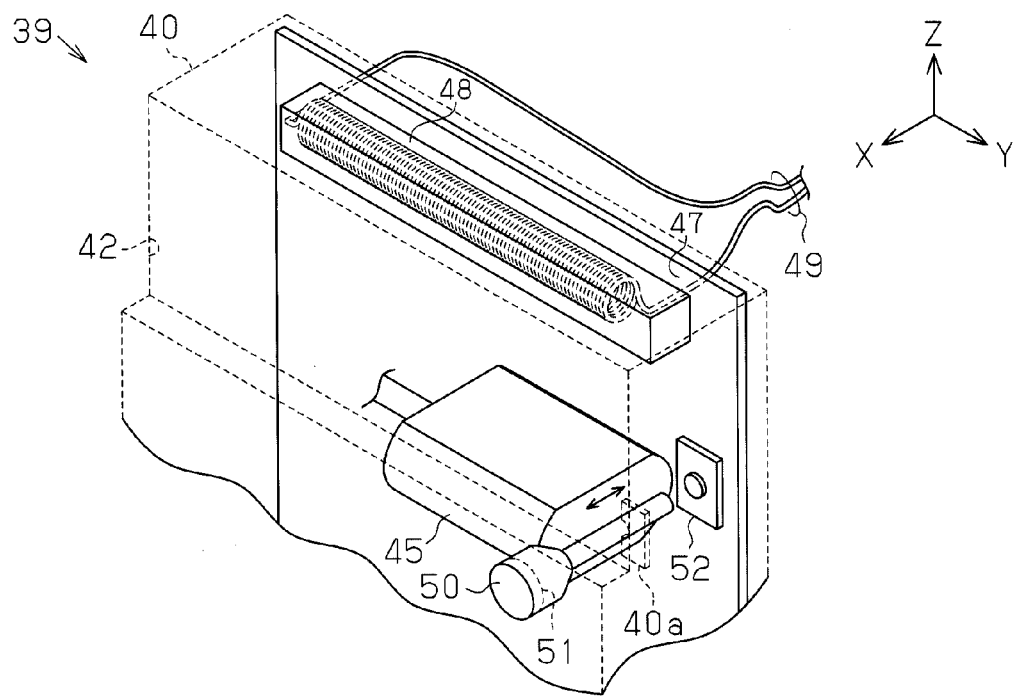
FIG. 8 is a perspective view showing the lock mechanism including an inlet transmitter arranged in a case.

The motor 45 functions as a drive source of the lock bar 43. A conversion mechanism 46 is coupled to the motor 45 to convert rotation produced by the motor 45 into linear movement of the lock bar 43. In the example of FIG. 8, the motor 45 is coupled to a substrate 47, which is accommodated in the accommodation compartment 42. In the case 40, the substrate 47 lies along a YZ plane that is orthogonal to the insertion direction (X) of the power feeding plug 23.

Figure 5:
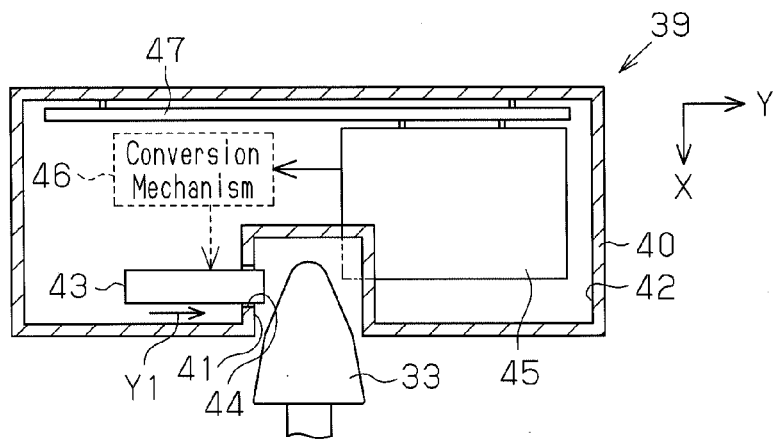
FIG. 5 is a cross-sectional view showing a lock mechanism in a state unlocking the power feeding plug.
Figure 6:
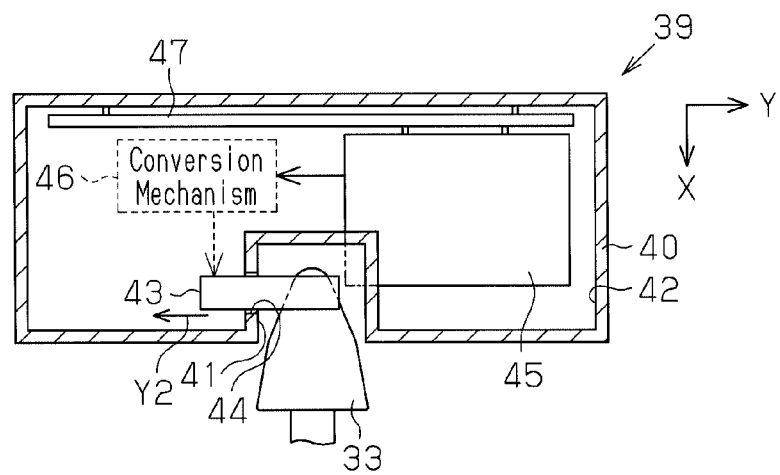
FIGS. 6 and 7 are cross-sectional views showing the lock mechanism in a state locking the power feeding plug.
Figure 7:
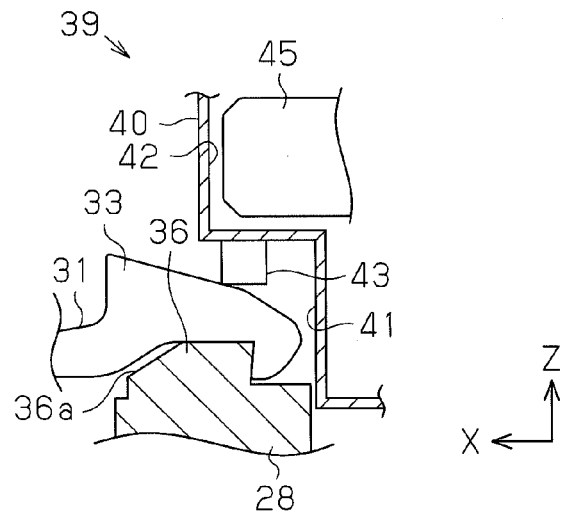

FIG. 5 shows the lock bar 43 at the retracted position. In this state, when the motor 45 produces rotation in one direction (forward rotation), the lock bar 43 moves straight in one direction (arrow Y1 in FIG. 5) to the projected position shown in FIG. 6. When located at the projected position, the lock bar 43 occupies the clearance between the lock lever port 41 and the hook 33 so that the hook 33 cannot be moved to the open position. It is preferable that the lock bar 43 contact and block the hook 33 from above at the projected position. In this manner, the lock mechanism 39 locks the lock lever 31. In a state in which the lock bar 43 is located at the projected position, when the motor 45 produces rotation in the other direction (reverse rotation), the lock bar 43 moves straight in the other direction (arrow Y2 in FIG. 6) and returns to the retracted position shown in FIG. 4. Thus, the lock bar 43 is moved away from above the hook 33 in the lock lever port 41. By separating the lock bar 43 from the hook 33, the lock mechanism 39 unlocks the lock lever 31. The lock mechanism 39 is in a lock state when the lock bar 43 is located at the projected position, and the lock mechanism 39 in an unlock state when the lock bar 43 is located at the retracted position.

As shown in FIG. 8, the accommodation compartment 42 accommodates an inlet transmitter 48, which is used for smart verification. The inlet transmitter 48 transmits an LF radio wave (request signal Srq). The inlet transmitter 48 is coupled to the substrate 47 by performing soldering or the like. Since the accommodation compartment 42 is arranged above the inlet 28, the inlet transmitter 48 is located above the inlet 28. The inlet transmitter 48 is connected to the verification ECU 13 by an in-vehicle cable 49. The verification ECU 13 controls the transmission of signals from the inlet transmitter 48. The inlet transmitter 48 may include, for example, a bar antenna. The inlet transmitter 48 is one example of an inlet antenna or a wireless authentication antenna.

Figure 9:
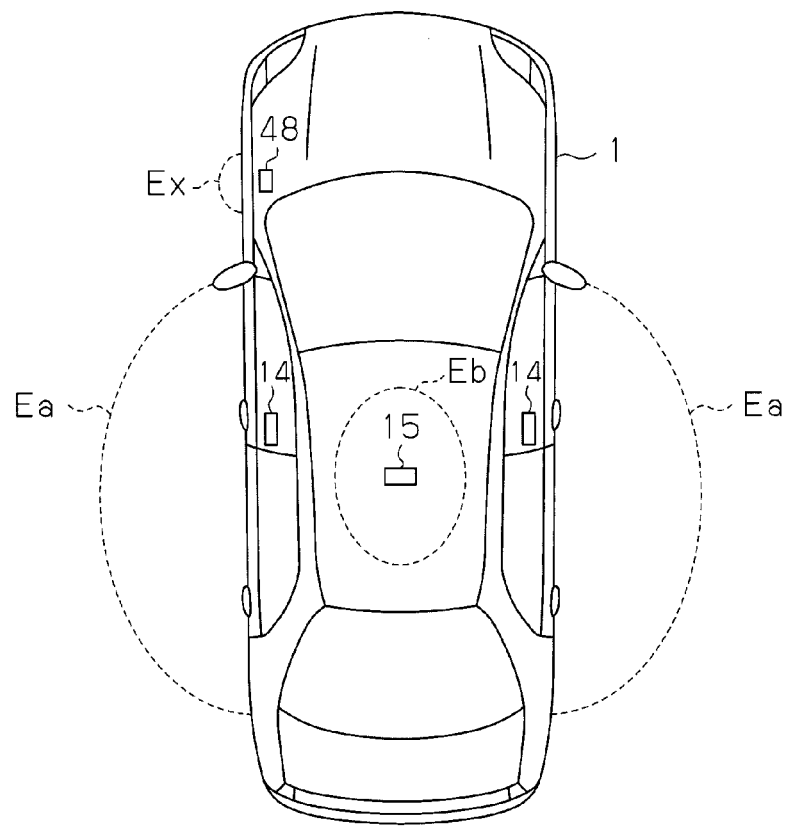
FIG. 9 is a schematic diagram showing a communication area of the inlet transmitter and a communication area of a key-operation-free system transmitter.

Referring to FIG. 9, communication areas of the inlet transmitter 48, the exterior transmitters 14, and the interior transmitter 15, that is, the transmission range of the request signal Srq, will now be described. The inlet transmitter 48 forms a relatively small communication area Ex outside the vehicle 1 near the inlet 28. Each exterior transmitter 14 forms a relatively large communication area Ea outside the vehicle 1 near the associated door. The interior transmitter 15 forms a communication area Eb inside the vehicle 1. The communication area Ex of the inlet transmitter 48 is smaller than the communication area Ea of each exterior transmitter 14 and the communication area Eb of the interior transmitter 15. In the illustrated example, the communication area Ex of the inlet transmitter 48 is overlapped with none of the communication areas Ea of the exterior transmitters 14 and the communication area Eb of the interior transmitter 15. When the electronic key 7 is located in the communication area Ex, the electronic key 7 receives a request signal Srq from the inlet transmitter 48 but not from the exterior and interior transmitters 14 and 15. When the electronic key 7 is located in the communication area Ea or Eb, the electronic key 7 receives a request signal Srq from one of the exterior transmitters 14 or the interior transmitter 15 but not from the inlet transmitter 48.

Figure 10:
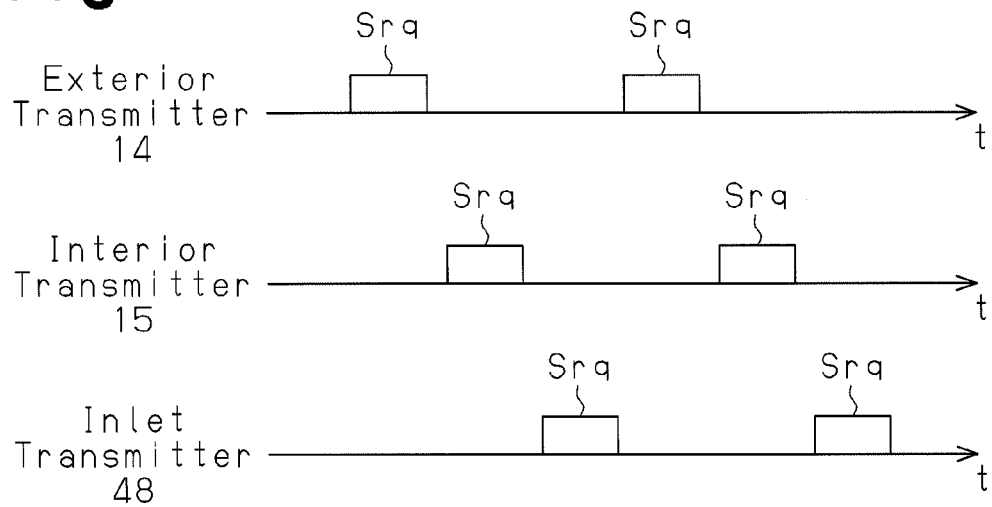
FIG. 10 is a chart illustrating the timing of request signals transmitted from the inlet transmitter and the key-operation-free transmitter.
Figure 11:
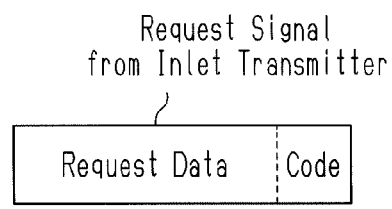
FIG. 11 is a diagram illustrating the data structure of the request signal transmitted from the inlet transmitter.
Figure 12:
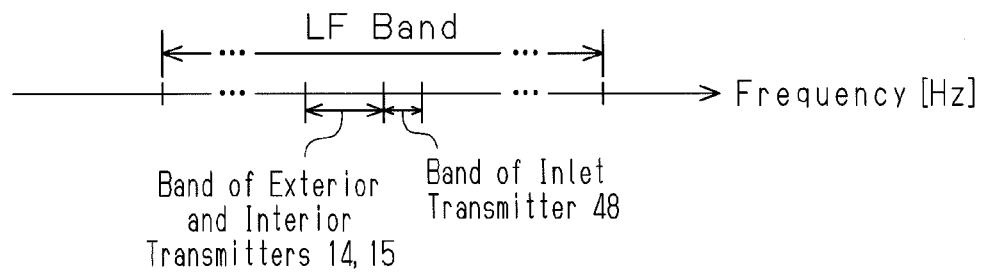
FIG. 12 is a diagram illustrating the frequency band of a radio wave transmitted from the inlet transmitter and the frequency band of a radio wave transmitted from the key-operation-free system transmitter.

The inlet transmitter 48 communicates in a mode that is preferably different from that of the transmitters 14 and 15, which communicate with the electronic key 7. For example, the inlet transmitter 48 may transmit the request signal Srq at a timing that differs from that of the exterior transmitters 14 and the interior transmitter 15. As shown in FIG. 10, the transmission timing may differ by having the exterior transmitters 14, the interior transmitter 15, and the inlet transmitter 48 transmit the request signal Srq one after another so that more than two request signals Srq are not transmitted at the same timing. As shown in FIG. 11, the request signal Srq transmitted from the inlet transmitter 48 may have a data structure that differs from the request signals Srq transmitted from the exterior and interior transmitters 14 and 15. This allows for the request signal Srq transmitted from the inlet transmitter 48 to be distinguished from the request signals Srq transmitted from the exterior and interior transmitters 14 and 15. As shown in FIG. 11, the inlet transmitter 48 may have a different data structure by adding a unique code, such as information of the originated device, to the request signal Srq. The exterior transmitters 14, the interior transmitter 15, and the inlet transmitter 48 transmit the request signal Srq on a transmission radio wave in the LF band. However, as shown in FIG. 12, the transmission radio wave frequency of the inlet transmitter 48 may differ from that of the exterior transmitters 14 and the interior transmitter 15. The inlet transmitter 48 may transmit the request signal by combining, as required, the transmission timing of FIG. 10, the data structure of FIG. 11, and the frequency of FIG. 12. In this manner, the inlet transmitter 48 forms a communication area dedicated for the inlet 28 near the inlet 28.

As shown in FIG. 8, the case 40 includes an unlock switch 50 (operation unit), which is manually operated to shift the lock mechanism 39 from a lock state to an unlock state. When the unlock switch 50 is operated, a basal end of the unlock switch 50 presses and activates a switch contact 52. After being pushed, the switch contact 52 is returned to its original position by resilient force, which permits momentary operation of the unlock switch 50.

As shown in FIG. 1, the power receiving connector 25 includes a lock ECU 53. The lock ECU 53 is connected to the in-vehicle bus 12 and communicates with other ECUs. Further, the lock ECU 53 is connected to the plug detection sensor 29, the motor 45, and the unlock switch 50. The lock ECU 53 functions as a control unit for the locking device 38.

When certain lock conditions are all satisfied, the lock ECU 53 produces forward rotation with the motor 45 and shifts the lock mechanism 39 from an unlock state to a lock state. In the preferred example, the lock conditions are that the power feeding plug 23 is inserted into the inlet 28, smart verification has been accomplished with the inlet transmitter 48, and the doors of the vehicle 1 are locked.

When certain unlock conditions are all satisfied, the lock ECU 53 produces reverse rotation with the motor 45 and shifts the lock mechanism 39 from the lock state to the unlock state. In the preferred example, the unlock conditions are that the unlock switch 50 is operated, smart verification has been accomplished with the inlet transmitter 48, and the doors of the vehicle 1 are unlocked.

The operation of the locking device 38 will now be described with reference to FIGS. 13 and 14.

Figure 13:
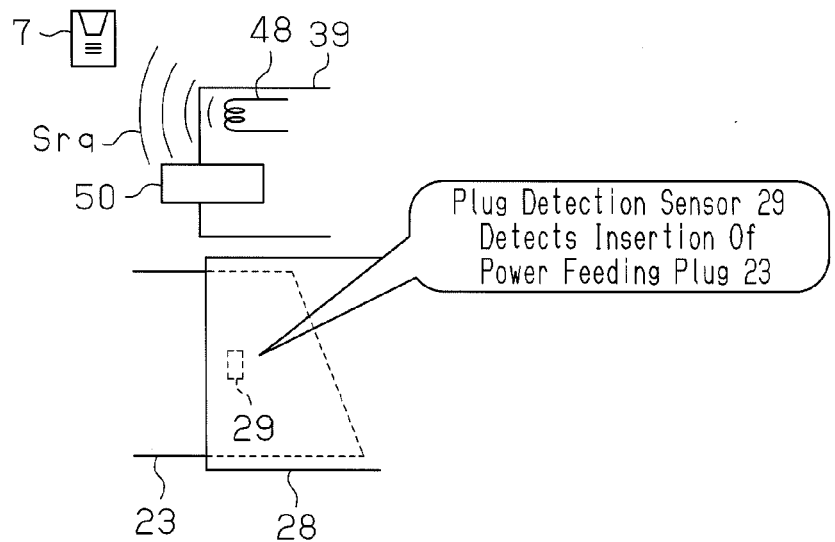
FIG. 13 is a diagram illustrating a locking operation of the lock mechanism.

Referring to FIG. 13, the plug detection sensor 29 detects the insertion of the power feeding plug 23 into the inlet 28. When receiving a detection signal from the plug detection sensor 29, the lock ECU 53 provides the verification ECU 13 with an inlet verification request signal Sa (refer to FIG. 1), which causes the verification ECU 13 to perform local smart verification at the inlet 28.

In response to the inlet verification request Sa from the lock ECU 53, the verification ECU 13 starts transmitting the request signal Srq from the inlet transmitter 48 and performs smart verification near the inlet 28. Here, the verification ECU 13 drives the inlet transmitter 48 in a communication mode that differs from exterior verification and interior verification to perform inlet vicinity verification. As shown in FIGS. 9 to 12, the inlet transmitter 48 transmits the request signal Srq in a communication mode that differs from that of the exterior and interior transmitters 14 and 15 in one or more of the communication area, transmission timing, data structure, and radio wave frequency.

When the electronic key 7 is in the communication area Ex of the inlet transmitter 48, the electronic key 7 receives the request signal Srq from the inlet transmitter 48 and transmits an ID signal Sid in response. When the vehicle tuner 16 receives the ID signal Sid, the verification ECU 13 performs ID verification with an ID code, which is registered in the verification ECU 13. When ID verification is accomplished, the verification ECU 13 provides the lock ECU 53 with an ID verification accomplishment notification signal Sb.

In response to the ID verification accomplishment notification signal Sb from the verification ECU 13, the lock ECU 53 sends an inquiry to the door lock device 10 on the state of the doors. When the lock ECU 53 receives a notification signal Sc from the door lock device 10 indicating that the doors are locked, the lock ECU 53 starts a locking operation with the lock mechanism 39. In the illustrated example, the lock ECU 53 produces forward rotation with the motor 45 and moves the lock bar 43 to the projected position. The lock bar 43 blocks the lock lever 31 from above so that the lock lever 31 cannot be moved to the open position. This prohibits unauthorized removal of the power feeding plug 23.

Figure 14:
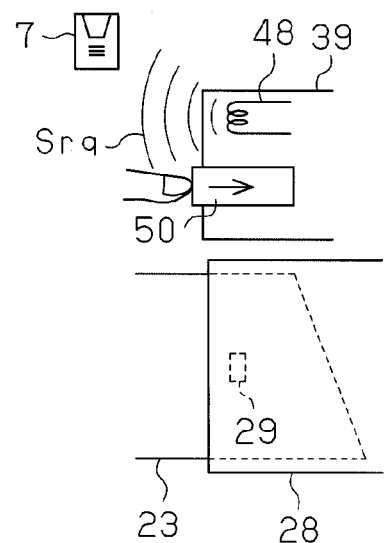
FIG. 14 is a diagram illustrating an unlocking operation of the lock mechanism.

Referring to FIG. 14, when removing the power feeding plug 23, which is locked by the lock mechanism 39, from the inlet 28, the user pushes the unlock switch 50 to shift the lock mechanism from the lock state to the unlock state. When the unlock switch 50 is pushed, the lock ECU 53 provides the verification ECU 13 with the inlet verification request Sa.

In response to the inlet verification request Sa, the verification ECU 13 starts transmitting the request signal Srq from the inlet transmitter 48 and performs smart verification near the inlet 28. In the same manner as the verification performed to lock the power feeding plug 23, the communication mode of the inlet transmitter 48 preferably differs from the other transmitters.

When the electronic key 7 is located in the communication area Ex of the inlet transmitter 48, communication is established between the inlet transmitter 48 and the electronic key 7 and ID verification is performed. Then, when the verification ECU 13 determines that ID verification has been accomplished, the verification ECU 13 provides the lock ECU 53 with an ID verification accomplishment notification signal Sb.

In response to the ID verification accomplishment notification signal Sb, the lock ECU 53 sends an inquiry to the door lock device 10 on the state of the doors. When the lock ECU 53 receives a notification signal Sd from the door lock device 10 indicating that the doors are unlocked, the lock ECU 53 starts an unlocking operation with the lock mechanism 39. In the illustrated example, the lock ECU 53 produces reverse rotation with the motor 45 and moves the lock bar 43 to the retracted position. The lock bar 43 moves away from the lock lever 31 and allows the lock lever 31 to move to the open position. This unlocks the lock lever 31 and permits removal of the power feeding plug 23.

Figure 15:
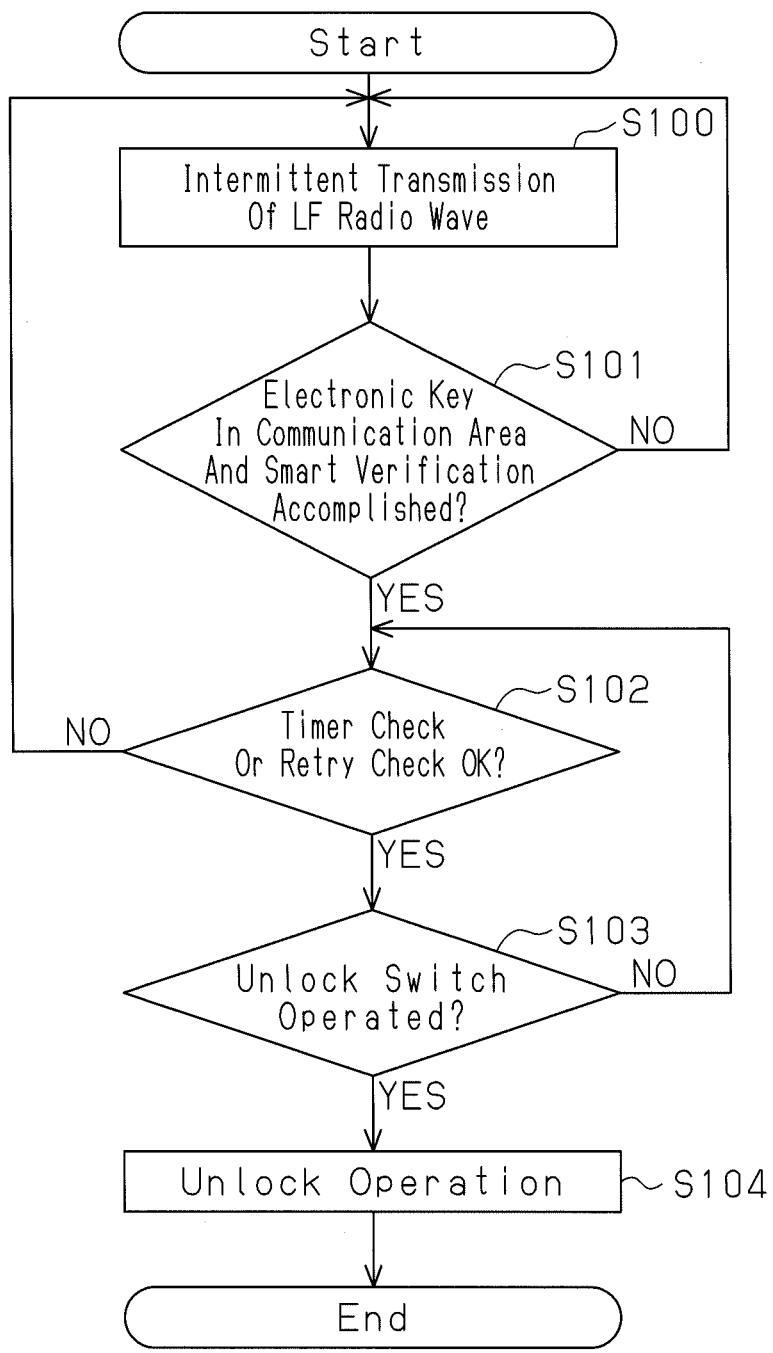
FIG. 15 is a flowchart illustrating a polling type unlocking operation.
Figure 16:
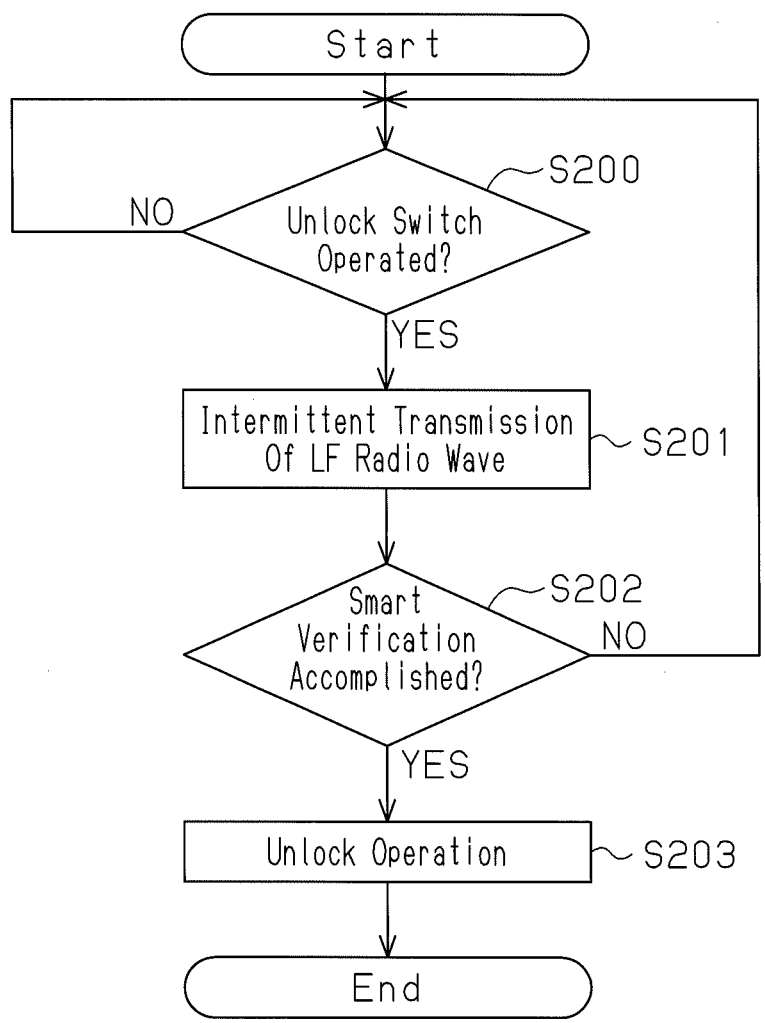
FIG. 16 is a flowchart illustrating a trigger type unlocking operation.

The transmission operation of the inlet transmitter 48, which is performed during the unlocking operation of the lock mechanism 39, will now be described. FIG. 15 shows a polling type transmission operation, and FIG. 16 shows a trigger type transmission operation.

The polling type transmission will now be described with reference to FIG. 15. In step S100, the inlet transmitter 48 intermittently transmits an LF radio wave (request signal Srq) at a controlled timing to constantly form the communication area Ex of the request signal Srq near the inlet 28 and wait for the electronic key 7 to enter the communication area Ex.

In step S101, the verification ECU 13 performs smart verification (inlet vicinity verification) on the electronic key 7 that has entered the communication area Ex. When inlet vicinity verification is accomplished, the processing proceeds to step S102. When inlet vicinity verification is not accomplished, the processing returns to step S100.

In step S102, the verification ECU 13 checks whether or not the unlock switch 50 has been operated within a limited time (timer check) or whether or not the unlock switch 50 has been operated for a number of times that is within a limited number (retry check). In step S102, when the unlock switch 50 is operated within the limited time or operated for a number of times that is within the limited number, the processing proceeds to step S103. Otherwise, the processing returns to step S100.

In step S103, the verification ECU 13 checks whether or not the unlock switch 50 has been operated. When the unlock switch 50 has been operated, the processing proceeds to step S104, and the lock ECU 53 performs the unlocking operation with the lock mechanism 39. When the unlock switch 50 has not been operated in step S103, the processing returns to step S102.

The trigger type transmission will now be described with reference to FIG. 16. In step S200, the verification ECU 13 checks whether or not the unlock switch 50 is operated. When the unlock switch 50 has been operated, the processing proceeds to step S201. When the unlock switch 50 has not been operated, the processing proceeds to step S200.

In step S201, the inlet transmitter 48 intermittently transmits the LF radio wave (request signal Srq) at a controlled timing. That is, the operation of the unlock switch 50 triggers the formation of the communication area Ex.

In step S202, the verification ECU 13 performs smart verification on the electronic key that enters the communication area Ex (inlet vicinity verification). When inlet vicinity verification is accomplished, the processing proceeds to step S203. Otherwise, the processing proceeds to step S200.

In step S203, the lock ECU 53 performs an unlocking operation with the lock mechanism 39.

As described above, the inlet transmitter 48, which is arranged in the case 40 of the lock mechanism 39, forms the communication area Ex for smart verification near the inlet 28. When the electronic key 7 is located near the inlet 28 in the communication area Ex, the electronic key 7 receives a request signal from the inlet transmitter 48 and starts smart verification with the inlet transmitter. The lock mechanism 39 is operated only when the smart verification is satisfied. Thus, the lock mechanism 39 is not operated unless the user intentionally brings the electronic key 7 near the inlet 28. This prevents the lock mechanism 39 from being operated when the user does not intend to do so and increases the effect for preventing unauthorized removal of the power feeding plug 23.

The present embodiment has the advantages described below.

(1) The inlet transmitter 48 for smart verification is arranged in the inlet 28. The conditions for operating the lock mechanism 39 includes accomplishment of smart verification (inlet vicinity verification), which is performed with the inlet transmitter 48. Thus, to operate the lock mechanism 39, the user must bring the electronic key 7 near the inlet 28. This prevents the lock mechanism 39 from being operated when the user does not intend to do so and increases the effect for preventing unauthorized removal of the power feeding plug 23. The power receiving connector 25, which includes the combination of the inlet 28 and the lock mechanism 39, is also referred to as a charging inlet device.

(2) The inlet transmitter 48 is integrally accommodated in the case 40 of the lock mechanism 39. Thus, the lock mechanism 39 and the inlet transmitter 48 form a single unit (integrated component). This decreases the number of components in the inlet 28 and reduces the burdensome of component management.

(3) The inlet transmitter 48 operates in a communication mode that differs from that of the exterior transmitters 14 and the interior transmitter 15. Thus, a communication area dedicated for the lock mechanism 39 may be formed near the inlet 28. This increase the accuracy of smart verification, which operates the lock mechanism 39.

(4) When the unlock switch 50, which is arranged on the case 40, is operated, the verification ECU 13 starts transmitting a request signal for verification to the inlet transmitter. This eliminates the need to transmit the request signal from the inlet transmitter 48 when there is a high probability of the electronic key 7 not being located near the inlet 28. Thus, power consumption of the vehicle power supply (battery) is decreased.

(5) The condition for starting the unlocking operation of the lock mechanism includes the operation of the unlock switch 50. This prevents the lock mechanism 39 from performing the unlocking operation when the user does not intend to do so.

(6) When the unlock switch 50 is operated, only the lock mechanism 39 performs the unlocking operation. Thus, the doors of the vehicle 1 remain locked and are not unlocked. In this manner, the unlocking operation of the lock mechanism 39 does not cooperate with the unlocking of the doors. This prevents the user from forgetting to lock the doors.

(7) The inlet transmitter 48 is coupled to the substrate 47 of the lock mechanism 39. Since the substrate 47 of the lock mechanism 39 supports the inlet transmitter 48, the number of components can be decreased.

It should be apparent to those skilled in the art that the present invention may be embodied in many other specific forms without departing from the spirit or scope of the invention. Particularly, it should be understood that the present invention may be embodied in the following forms.

The inlet transmitter 48 does not have to be formed integrally with the lock mechanism 39. For example, the inlet transmitter 48 may be a component of a unit that does not include the lock mechanism 39. The inlet transmitter 48 does not have to be coupled to the lock mechanism 39 from the beginning and may be coupled at a later date. Further, the inlet transmitter 48 does not have to be coupled to the lock mechanism 39 and may be coupled to other parts, such as the inlet 28.

The frequency of the inlet transmitter 48 is not limited to the LF band and may be in other bands, such as the UHF band.

The inlet transmitter 48 does not have to be a bar antenna and may be another type of antenna, such as a loop antenna or a dipole antenna.

The inlet transmitter 48 may be used to have the lock mechanism 39 perform any one of a locking operation and an unlocking operation.

The location of the inlet transmitter 48 is not limited to above the inlet 28. For example, the inlet transmitter 48 may be arranged anywhere near the inlet 28 such as beside or below the inlet 28.

The inlet transmitter 48 may be spirally wound around the cylindrical insertion opening of the inlet 28.

The operation unit of the lock mechanism 39 is not limited to the unlock switch 50. For example, in lieu of or in addition to the unlock switch 50, the operation unit may include a lock switch that is operated when switching the lock mechanism 39 to a lock state.

The lock mechanism 39 may alternately perform the locking operation and the unlocking operation whenever the operation unit (unlock switch 50) of the lock mechanism 39 is operated. In this case, after unlocking the power feeding plug 23, the user only needs to operate the operation unit (unlock switch 50) once more.

The condition for starting the locking operation of the lock mechanism 39 may just be accomplishment of the inlet vicinity verification. The same applies to the unlocking operation of the lock mechanism 39.

The unlock switch 50 is not limited to a momentary type and may be, for example, an alternator type.

The unlock switch 50 is not limited to a push type and may be, for example, a rotatable knob or lever.

The unlock switch 50 may be arranged at a location other the case 40 of the lock mechanism 39 such as on the inlet 28.

The lock bar 43 does not have to be bar-shaped and may be a movable member that is, for example, flat or triangular.

The actuator that moves the lock bar 43 is not limited to the motor 45 and may be, for example, a solenoid.

The lock mechanism 39 does not have to use the lock bar 43 to block the hook 33 of the lock lever 31 from above. In lieu of or in addition to the lock bar 43, the lock mechanism 39 may include a pin that hooks to the power feeding plug 23 to fix the power feeding plug 23 to the inlet 28.

The lock lever 31 may be arranged upside down from the illustrated arrangement.

The vehicle 1 is not limited to a hybrid vehicle and may be, for example, an electric vehicle.

The present examples and embodiments are to be considered as illustrative and not restrictive, and the invention is not to be limited to the details given herein, but may be modified within the scope and equivalence of the appended claims.

The invention claimed is:

1. A charging inlet device installed in a vehicle, wherein the vehicle includes a battery and an inlet, which receives a power feeding plug to charge the battery, and wherein the vehicle transmits a wireless verification signal to an electronic key and permits or performs an operation when verification of the electronic key is accomplished, the charging inlet device comprising:
   a lock mechanism that prevents removal of the power feeding plug from the inlet, wherein the lock mechanism performs at least one of a locking operation and an unlocking operation on the power feeding plug when the verification of the electronic key through a first wireless verification signal is accomplished;
   a first inlet antenna arranged near the inlet and transmitting the first wireless verification signal to the electronic key when the electronic key is provided in a first communication area proximal the inlet; and
   wherein the vehicle comprises a second antenna for transmitting the wireless verification signal to the electronic key when the electronic key is provided in a second communication area, the second communication area provided distal to the inlet.

2. The charging inlet device according to claim 1, wherein the lock mechanism includes a mechanical component, which is movable to perform the locking operation and the unlocking operation, and a case, which accommodates the mechanical component; and
   the inlet antenna is accommodated in the case.

3. The charging inlet device according to claim 1, wherein that the second antenna is communicable with the electronic key, and the inlet antenna communicates with the electronic key in a communication mode that differs from that of the further antenna so that communication between the electronic key and the inlet antenna is distinguishable from communication between the electronic key and the further antenna.

4. The charging inlet device according to claim 1, further comprising an operation unit that is operated when starting the verification through wireless communication between the inlet antenna and the electronic key.

5. The charging inlet device according to claim 4, wherein the operation unit is an unlock switch operated to perform the unlocking operation with the lock mechanism.

6. The charging inlet device according to claim 4, wherein the lock mechanism alternately performs the lock operation and the unlock operation whenever the operation unit is operated.

7. The charging inlet device according to claim 1, wherein the vehicle is an electric vehicle or a hybrid vehicle, and the inlet is connected to the battery which powers the motor for driving wheels of said vehicle.

8. A locking device for a power feeding plug installed in a vehicle, wherein the vehicle includes a battery, a motor driven by the battery, an inlet that receives the power feeding plug to charge the battery, a door antenna that transmits a verification radio wave signal to an electronic key, and a door locked or unlocked when authorized radio wave communication is performed between the electronic key and the door antenna, the locking device comprising:
   a movable member moved between a lock position and an unlock position, wherein the movable member is located to interfere with the power feeding plug, which is connected to the inlet, upon removal of the power feeding plug when located at the lock position to prohibit removal of the power feeding plug from the inlet, and wherein the movable member is moved to a position at which the movable member does not interfere with the power feeding plug when located at the unlock position to permit removal of the power feeding plug from the inlet;
   an inlet antenna that transmits the verification radio wave signal to a local communication area including the inlet, wherein the inlet antenna and the door antenna are arranged at different locations; and
   a controller that moves the movable member when verification of the electronic key is accomplished in response to the verification radio wave signal from the inlet antenna.

9. The locking device according to claim 8, wherein the inlet antenna includes a communication area separated from that of the door antenna.

10. The locking device according to claim 8, wherein the inlet antenna and the door antenna transmit the verification radio wave signal at different timings.

11. The locking device according to claim 8, wherein the verification radio wave signal transmitted from the inlet antenna and the verification radio wave signal transmitted from the door antenna have different data structures.

12. The locking device according to claim 8, wherein the inlet antenna and the door antenna transmit the verification radio wave signal at different frequencies.

13. The locking device according to claim 8, further comprising a case that accommodates the movable member, wherein the case includes an outer surface in which a lock lever port is formed to receive a lock lever of the power feeding plug, and the movable member blocks the lock lever in the lock lever port at the lock position.

14. The locking device according to claim 8, wherein the inlet antenna forms the local communication area that is dedicated for the inlet near the inlet.

* * * * *